United States Patent
Breitbach et al.

(10) Patent No.: US 9,806,885 B1
(45) Date of Patent: Oct. 31, 2017

(54) DUAL USE CRYPTOGRAPHIC SYSTEM AND METHOD

(71) Applicants: Joshua P. Breitbach, Anamosa, IA (US); Mark R. Wagner, Robins, IA (US); Adriane Rae Van Auken, Marion, IA (US); Jerome L. Schmidt, Cedar Rapids, IA (US); Kevin M. Bayer, Cedar Rapids, IA (US)

(72) Inventors: Joshua P. Breitbach, Anamosa, IA (US); Mark R. Wagner, Robins, IA (US); Adriane Rae Van Auken, Marion, IA (US); Jerome L. Schmidt, Cedar Rapids, IA (US); Kevin M. Bayer, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 399 days.

(21) Appl. No.: 14/498,472

(22) Filed: Sep. 26, 2014

(51) Int. Cl.
 *H04L 29/06* (2006.01)
 *H04L 9/10* (2006.01)
 *H04L 9/00* (2006.01)

(52) U.S. Cl.
 CPC ............... *H04L 9/10* (2013.01); *H04L 9/002* (2013.01); *H04L 2209/12* (2013.01)

(58) Field of Classification Search
 CPC ................................ G06F 21/72; G06F 21/10
 USPC ........................................................ 713/189
 See application file for complete search history.

(56) References Cited

U.S. PATENT DOCUMENTS

| | | | | |
|---|---|---|---|---|
| 7,076,595 | B1* | 7/2006 | Dao | G06F 15/7867 710/100 |
| 7,734,933 | B1* | 6/2010 | Marek | G06F 21/57 711/173 |
| 7,987,497 | B1* | 7/2011 | Giles | G06F 9/45537 380/59 |
| 2002/0049626 | A1* | 4/2002 | Mathias | G06Q 10/0633 705/304 |
| 2003/0115322 | A1* | 6/2003 | Moriconi | G02B 6/132 709/224 |
| 2005/0108416 | A1* | 5/2005 | Khosravi | H04L 45/00 709/232 |
| 2007/0058632 | A1* | 3/2007 | Back | H04L 12/2602 370/392 |
| 2008/0198865 | A1* | 8/2008 | Rudnick | H04L 45/124 370/406 |
| 2011/0150045 | A1* | 6/2011 | Thompson | H04B 1/28 375/147 |
| 2011/0271007 | A1* | 11/2011 | Wang | H04L 45/306 709/238 |
| 2012/0089707 | A1* | 4/2012 | Baba | H04L 41/022 709/220 |

(Continued)

OTHER PUBLICATIONS

Cummings, "Software Radios for Airborne Platforms", Apr. 1999, IEEE, p. 732-747.*

*Primary Examiner* — Taghi Arani
*Assistant Examiner* — Gregory Lane
(74) *Attorney, Agent, or Firm* — Donna P. Suchy; Daniel M. Barbieri

(57) ABSTRACT

Cryptographic communication systems and methods can utilize a base interface and a channel interface. Plug-ins can be utilized to provide cryptographic functions configured for either a first customer or a second customer. The first customer can be a United States domestic customer and the second customer can be an international customer.

17 Claims, 8 Drawing Sheets

(56) References Cited

U.S. PATENT DOCUMENTS

2012/0096445 A1* 4/2012 Berg .................. G06F 9/44547
 717/140
2014/0003445 A1* 1/2014 Lee ....................... H04L 47/803
 370/412

* cited by examiner

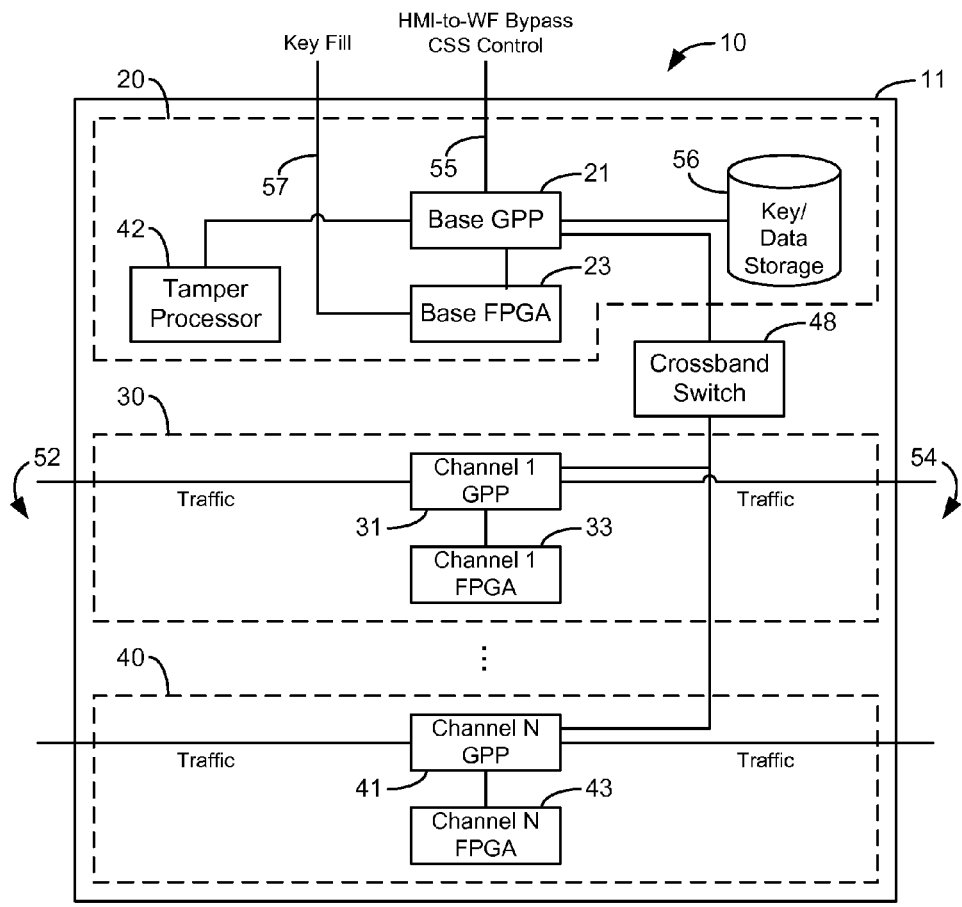
FIG. 1
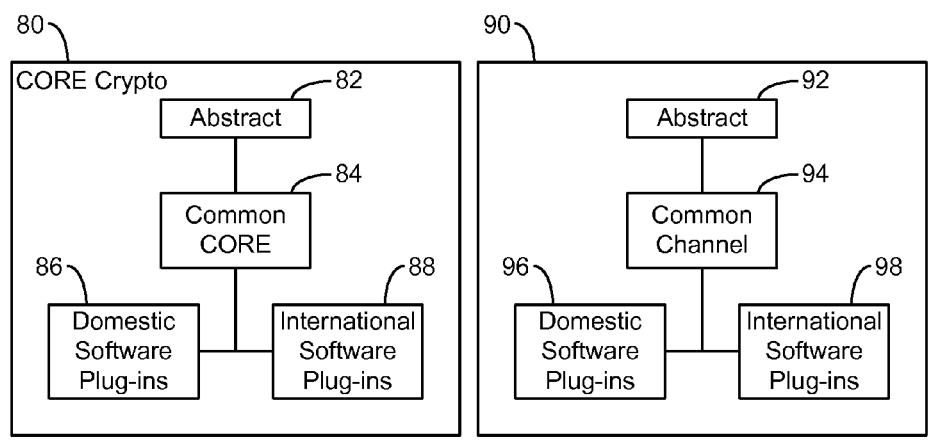
FIG. 2
FIG. 3

DUAL USE CRYPTOGRAPHIC SYSTEM AND METHOD

BACKGROUND

The present disclosure relates generally to the field of secure communications including but not limited to cryptographic systems and methods having a flexible architecture.

Cryptographic communications are used throughout the world. Cryptographic products provide connectivity for tactical and operational platforms and can support multiple levels of sensitive and classified data simultaneously while ensuring separation and confidentiality for each domain as required by data owners. Cryptographic products can simultaneously host and protect a wide range of data, for example, from unclassified maintenance and system health data to highly sensitive mission, tactical, and/or intelligence data.

Cryptographic products are used by both domestic and international customers and are specifically designed for each type of customer according to governed specifications and protocols. For example, cryptographic products designed for domestic customers have different hardware than the hardware used in cryptographic products designed for international customers. The hardware generally implements a cryptographic subsystem (CSS) that separates red and black side processing for each type of cryptographic product. The hardware typically includes components custom designed for specific customers and can include specific applications. The hardware often includes customer specific integrated circuits (ASICS) and customer specific processors. The hardware used in cryptographic products can be somewhat inflexible and is not easily modified or upgraded for new functions.

Therefore, there is a need for a cryptographic product architecture that can be easily configured for use by domestic and international customers. There is also a need for a cryptographic subsystem with a modifiable architecture. Further, there is a need for cryptographic system and method which is more flexible and easier to upgrade. There is also a need for a radio with a modifiable cryptographic architecture.

It would be desirable to provide a system and/or method that provides some of these or other advantageous features. Other features and advantages will be made apparent from the present specification. The teachings disclosed extend to those embodiments which fall within the scope of the appended claims, regardless of whether they accomplish some of the aforementioned needs.

SUMMARY

In one aspect, the inventive concepts disclosed herein are directed to a cryptographic product. The cryptographic product includes a base general purpose processor. The cryptographic product also includes a channel including a channel general purpose processor. Base software is executed on the base general purpose processor, and channel software is executed on the channel general purpose processor. The base software and the channel software each include an abstract layer providing a common interface for operating system functions, a common core layer operating above the abstract layer and providing code necessary to execute a first software plug-in for a first customer or a second software plug-in for a second customer.

In a further aspect, the inventive concepts disclosed herein are directed to a method of communicating cryptographic data. The method includes executing an abstract layer on a base processor and a channel processor to provide a common interface for operating system functions. The method also includes executing a common layer above the abstract layer to translate between the operating system functions and plug-in level functions. The method also includes executing some plug-ins configured for a first customer or a second customer.

In a further aspect, the inventive concepts disclosed herein are directed to a communication system including a base interface configured to execute an operating system and a channel interface configured to encrypt and decrypt data in response to plug-in execution. The channel interface includes a field programmable gate array including an accelerator loaded using a partial reconfiguration mechanism.

BRIEF DESCRIPTION OF THE DRAWINGS

The invention will become more fully understood from the following detailed description, taken in conjunction with the accompanying drawings, wherein like reference numerals refer to like elements, in which:

FIG. 1 is a general block diagram of a cryptographic system including a base and at least one channel, according to an exemplary embodiment;

FIG. 2 is a general block diagram of a software stack for the base of the cryptographic system illustrated in FIG. 1, according to another exemplary embodiment;

FIG. 3 is a general block diagram of a software stack for the at least one channel of the cryptographic system illustrated in FIG. 1, according to another exemplary embodiment;

DETAILED DESCRIPTION

Figure 4:
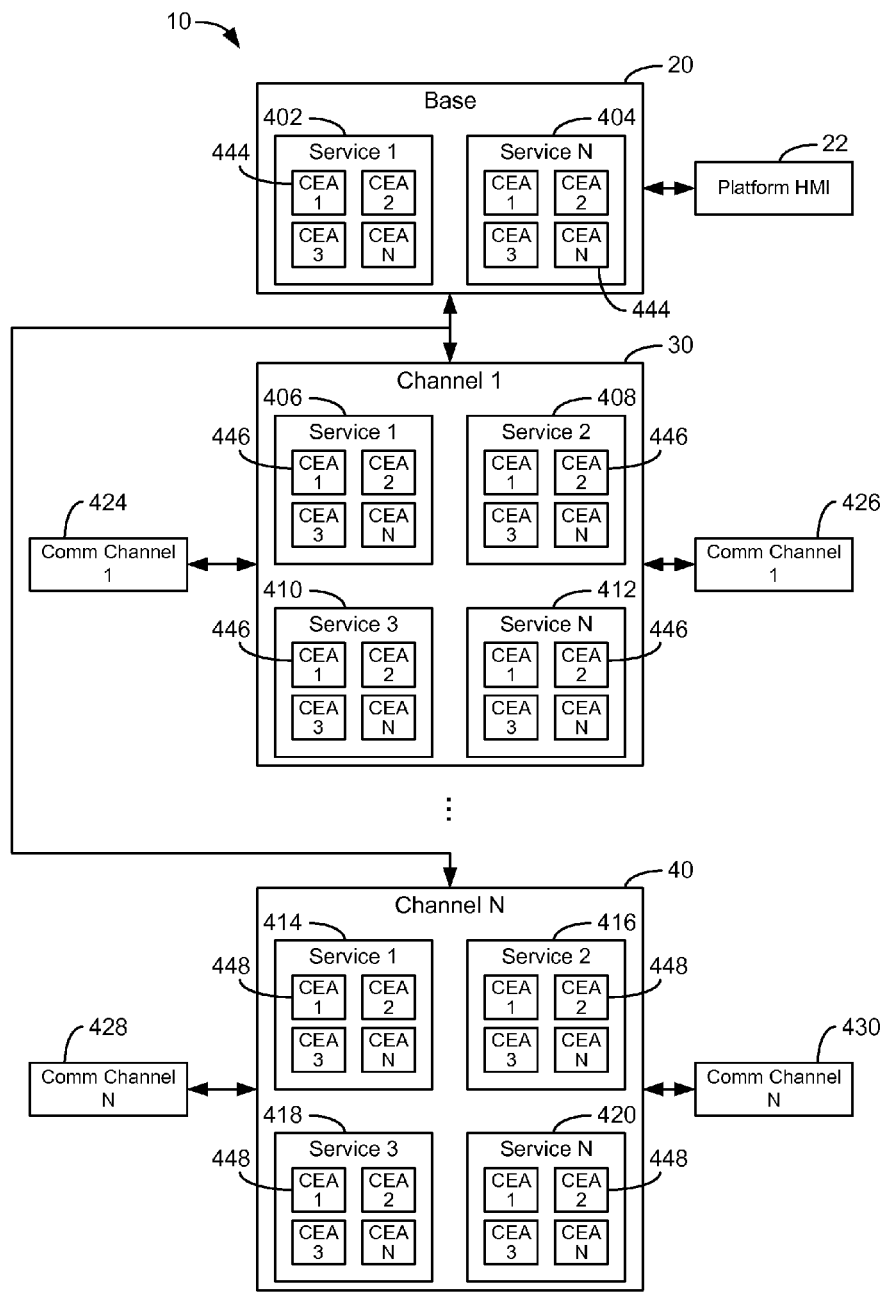
FIG. 4 is a more detailed block diagram of the cryptographic system illustrated in FIG. 1 showing services performed on the core and the at least one channel, according to another exemplary embodiment.

Before describing in detail the particular improved system and method, it should be observed that the invention includes, but is not limited to a novel structural combination of data/signal processing components and communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In some embodiments, systems and methods of processing cryptographic data advantageously utilize flexible architecture. The architecture advantageously allows versatility through the development of tailored plug-ins, depending on the needs, limitations, and/or requirements of a particular task in some embodiments. In some embodiments, the architecture is advantageously configured to process data for international or domestic customers. The architecture described is not limited to any specific media or platform interface.

In some embodiments, a software defined crypto solution is implemented. The hardware platform may include commercial off-the-shelf (COTS) parts available from various computing/integrated circuit vendors in some embodiments. In some embodiments, sensitive code is contained within separately developed software general purpose processor (GPP) and field programmable gate array (FPGA) plug-ins.

In some embodiments, the plug-ins create an ala carte menu of algorithms that may be loaded on the cryptographic hardware per customer needs. A plug-in development kit (PDK) enables the development of algorithm plug-ins, such as waveform cryptographic equipment applications (CEAs), without the need for access to the entire cryptographic code base in some embodiments. A small set of library files can be provided to the developer to support development of a plug-in that will drop in and work within the cryptographic system in some embodiments. The use of partial reconfiguration (PR) in a field programmable gate array allows for on-the-fly reloading of hardware-based algorithm acceleration in some embodiments.

The commercial off the shelf hardware solution provides multiple indicators for tamper event detection in some embodiments. The software loaded into the cryptographic system monitors different sets of indicators based on the customer and use case, allowing for multiple anti-tamper (AT) configurations in some embodiments.

In some embodiments, the entire cryptographic system (including the anti-tamper software) is reprogrammable in the factory at the top level allowing for generic hardware to be built and tested until ready for sale when customer-specific software (containing algorithms) can be loaded. In some embodiments, everything but anti-tamper software (even including boot software) can be reprogrammed allowing a customer to load custom plug-ins. In some embodiments, a software defined emissions security solution can be used to configure generic, commercial off-the-shelf parts on a printed circuit board in a way that suppresses compromising emanations. Without the software, the hardware serves no software defined emission security purpose, which can eliminate the need for International Traffic in Arms Regulations (ITAR) restrictions for the hardware in some embodiments. In further embodiments, the commercial off-the-shelf hardware platform is extensible and physically configurable through generic plug-and-play hardware daisy-chained together.

With reference to FIG. 1, a cryptographic system 10 includes a cryptographic subsystem (CSS) 11. CSS 11 can include a base 20 and some channels 30 and 40 depending upon design criteria and system requirements. Base 20 includes a base general purpose processor 21, a base field program gate array 23, a tamper processor 42, and key/data storage 56 in some embodiments. Channel 30 includes a channel general purpose processor 31 and a channel field programmable gate 33 in some embodiments. Cryptographic system 10 can be utilized to communicate, process, encrypt, decrypt, or store data or traffic on a red side 54 and a black side 52. Cryptographic system 10 can include a host system coupled to a host interface 55. Cryptographic system 10 can be configured for use with domestic customers and international customers in some embodiments.

CSS 11 can provide black side and red side processing associated with data on channels 30 and 40 in some embodiments. All traffic processing progressing from black side 52 to red side 54 or red side 54 to black side 52 travels through CSS 11 so there are no other channels of communication between black side 52 and red side 54.

Base 20 controls cryptographic processor 21 and performs services such as data management and communication management with the host system or platform. Base 20 communicates with the host system via host interface 55 in some embodiments. Host interface 55 can include a platform human machine interface in some embodiments. Base 20 also performs services such as bulk encryption and decryption, integrity and authentication support, and configuration of channels 30 and 40 in some embodiments.

Base general purpose processor 21 is coupled to a key fill interface 57, to tamper processor 42 and to key/data storage 56. Keys and certificates can be provided via key fill interface 57 or the host interface 55 in some embodiments. Key fill interface 57 allows the host system to load red or black data using a DS-101 protocol in some embodiments.

Base general purpose processor 21 can be any kind of processing device. In some embodiments, base general purpose processor 21 and field programmable gate array 23 are commercial off the shelf devices. Base general purpose processor 21 and base field programmable gate array 23 can be distinct parts or can be combined into a system on chip (SOC) architecture in some embodiments.

Channels 30 and 40 execute some separate cryptographic services that operate independently and are used for encryption/decryption of user data traffic and are used for bypass of data. Channels 30 and 40 include red and black data interfaces for user traffic and control/status (out-of-band) bypass within the waveform or between the waveform and the platform human machine interface in some embodiments. Channel general purpose processor 31 and channel field programmable gate array 33 can be distinct parts, can be combined in a system on chip architecture and can be commercial off the shelf parts in some embodiments.

In some embodiments channel 40 is similar to channel 30. Channel 40 includes a general purpose processor 41 and a field programmable gate array 43. Additional channels can be provided in some embodiments.

Tamper processor 42 performs anti-tampering operations (e.g., monitoring detection indicators in cryptographic subsystem 11 for tamper events) for cryptographic system 10 in some embodiments. Tamper processor 42 can analyze data associated with base general purpose processor 21 to determine whether a tampering event has occurred in some embodiments. In some embodiments, tamper processor 42 commands base 20 to perform actions in response to tamper events.

Cross band switch 48 is utilized to provide connections between one of channels 30 and 40 and base 20 in some embodiments. Cross band switch 48 can be configured by software to provide a path for inter-channel communication (e.g. between compatible security level channels) in some embodiments. Cross band switch 48 is used by base general purpose processor 21, channel general purpose processor 31, and general purpose processor 41 to communicate in some embodiments.

With reference to FIGS. 2 and 3, software 80 for base 20 of cryptographic subsystem 11 is arranged in layers including in abstract layer 82, a common core layer 84, a set of domestic core software plug-ins 86 and a set of international core software plug-ins 88 in some embodiments. Software 90 for channels 30 and 40 of cryptographic subsystem 11 has a similar structure including an abstract layer 92, a common channel layer 94 and sets of plug-ins 96 for domestic customers and sets of plug-ins 98 for international customers in some embodiments.

Software 80 and 90 are executed on top of an operating system residing on base 20 and channels 30 and 40, respectively, in some embodiments. Software 80 configures base 20 of cryptographic subsystem 11 to provide cryptographic services for data management, communication with the host system, bulk encryption/decryption, integrity and authentication support, and configuration of channels 30 and 40 in some embodiments. Software 90 configures channel 30 or channel 40 of cryptographic subsystem 11 to provide separate cryptographic services that operate independently and are used for the encryption/decryption of user data traffic and bypass in some embodiments. Software 80 and software 90 set-up the control and status bypass channels between the human machine interface and the red and black waveform applications to allow the boot-up processing outside of cryptographic subsystem 11 to complete in some embodiments.

The lowest layer of software 80 and 90 is the operating system abstract layer or abstract layers 82 and 92 in some embodiments. Abstract layers 82 and 92 provide a thin software layer for a common interface to access operating system specific functions in some embodiments.

A common core layer 84 sits on top of abstract layer 82 and a common channel layer 94 sits on top of abstract layer 92 in some embodiments. Common core layer 84 and common channel layer 94 provide the hooks or translation necessary to utilize plug-ins 86 and/or 88 and to utilize plug-ins 96 and 98, respectively, in some embodiments.

Common core layer 84 translates commands utilized in plug-ins 86 and 88 into commands suitable for abstract layer 82 in some embodiments. Common channel layer 94 translates commands utilized in plug-ins 96 and 98 into commands suitable for abstract layer 92 in some embodiments. Common core layer 84 and a common channel layer 94 are implemented as a set of processes in some embodiments.

In some embodiments, common core layer 84 and common channel layer 94 can be implemented as a set of processes that are executed in independent member spaces (e.g., memory spaces physically separate between base 20 and channels 30 and 40 as well as logically separate between processes on the same processor). Functions which belong in separate processes rather than in combined processes or in processes combined with the main process are determined based on the need to keep a function separate from others. Such separate processes are capable of communicating with each other via inter process communications (IPC).

In some embodiments, common core layer 84 and common channel layer 94 (e.g., a framework to accept plug-ins) are both void of any specifically cryptographic material or any sensitive algorithms. Cryptographic material and sensitive algorithms are provided in plug-ins 86, 88, 96, and 98 in some embodiments.

Cryptographic system 10 advantageously utilizes plug-ins 86, 88, 96 and 98 to customize red and black specific capabilities for cryptographic services in some embodiments. Plug-ins 86, 88, 96 and 98 can be in the form of software and field programmable gate array bit streams in some embodiments. Plug-ins 86, 88, 96 and 98 can include implementations having cryptographic functions, implementations of hash algorithms, cryptographic equipment applications (CEAs), key-type processing, or other functions that are specific to particular users, customers, or waveforms in some embodiments.

Plug-ins 86, 88, 96, and 98 are loadable software modules that are used to augment the functionality of common core layer 84 and common channel layer 94, respectively, in some embodiments. Plug-ins 86, 88, 96, and 98 may be implemented as standalone processes or as dynamically loaded libraries in some embodiments.

In some embodiments, domestic plug-ins 86 and 96 contain information sensitive to the United States, such as, Suite A algorithms. Access to domestic plug-ins 86 and 96 is limited to proper security clearances. International software plug-ins 88 and 98 are generally developed separately with respect to domestic software plug-ins 86 and 96 as well as separately from abstract layer 82, common core layer 84, abstract layer 92, and common channel layer 94. International plug-ins 88 and 98 have the capability of plugging into or interacting with layers such as common core layer 84 and common channel layer 94, respectively, to augment its functionality with an algorithm (specific to international customers) executing on general purpose processor 21 and field programmable gate array 23 and on general purpose processor 31 and field programmable gate array 33, respectively. Domestic plug-ins 86 and 96 have the capability of plugging into or interacting with layers such as common core layer 84 and common channel layer 94, respectively, to augment its functionality with an algorithm (specific to domestic customers) executing on general purpose processor 21 and field programmable gate array 23 and on general purpose processor 31 and field programmable gate array 33, respectively.

Communication associated with software 80 and 90 can occur via method of inter-process communication (IPC). The memory space inter-process communication and process task switching is managed by operating system software.

A secure programming process for plug-ins 86, 88, 96, and 98 is provided for plug-in registration and for a protocol for the exchange of data with plug-ins 86, 88, 96, and 98 in some embodiments. In some embodiments, software plug-ins 86, 88, 96 and 98 are developed utilizing a plug-in development kit (PDK) which provides a set of libraries that enable the developer to create a stand-alone cryptographic plug-in or a dynamically loaded library plug-in. Accordingly, a developer can create a cryptographic plug-in to fit within the framework of cryptographic system 10 using the full support of its core functions and field programmable gate arrays 33 and 43 (e.g. accelerators if necessary) in some embodiments. In some embodiments, a plurality of accelerators can be employed.

With reference to FIG. 4, base 20 executes services 402 and 404 and channel 30 executes services 406, 408, 410, and 412. Channel 30 is positioned between communication channel interfaces 424 and 426. The services 402 and 404 are a collection of cryptographic equipment applications (CEAs) 444 that can be created for base 20. Similarly, services 406, 408, 410, and 412 are a collection of cryptographic equipment applications 446 that can be created for channel 30. Channel 40 between channel interfaces 428 and 430 executes services 414, 416, 418 and 420 which are a collection of cryptographic equipment applications 448. Each of services 402, 404, 406, 408, 410, 412, 414, 416, 418 and 420 can be a plug-in (e.g., one of plug-ins 86, 88, 96, or 98 (FIGS. 2-3)) and can have one or multiple cryptographic equipment applications 444, 446, and 448 running within it.

The services 402 and 404 are executed on base 20 and used for functions such as key exchanges, key update, and integrity and authentication services. Services 406, 408, 410 and 412 are executed on channel 30 and provide functions such as communication security (COMSEC) and transmission security (TRANSEC). The host system can manage services 404, 406, 408, 410, 412, 414, 416, 418 and 420 by using commands such as create, destroy, insert remove, get status, and set up. These commands are used for services 402, 404, 406, 408, 410, 412, 414, 416, 418 and 420 running on base 20 and channels 30 and 40. Service management functionality provided by cryptographic system 10 allows the host to create a service 404, 406, 408, 410, 412, 414, 416, 418 and 420, destroy a service 404, 406, 408, 410, 412, 414, 416, 418 and 420, reset a channel 30 or 40 if it has alarmed, insert elements into some of services 404, 406, 408, 410, 412, 414, 416, 418 and 420, select elements within some of services 404, 406, 408, 410, 412, 414, 416, 418 and 420 to use with some cryptographic equipment applications 442, 444 or 446, remove elements from some services 404, 406, 408, 410, 412, 414, 416, 418 and 420, start some of services 404, 406, 408, 410, 412, 414, 416, 418 and 420, stop some of services 404, 406, 408, 410, 412, 414, 416, 418 and 420, and query service status.

Figure 5:
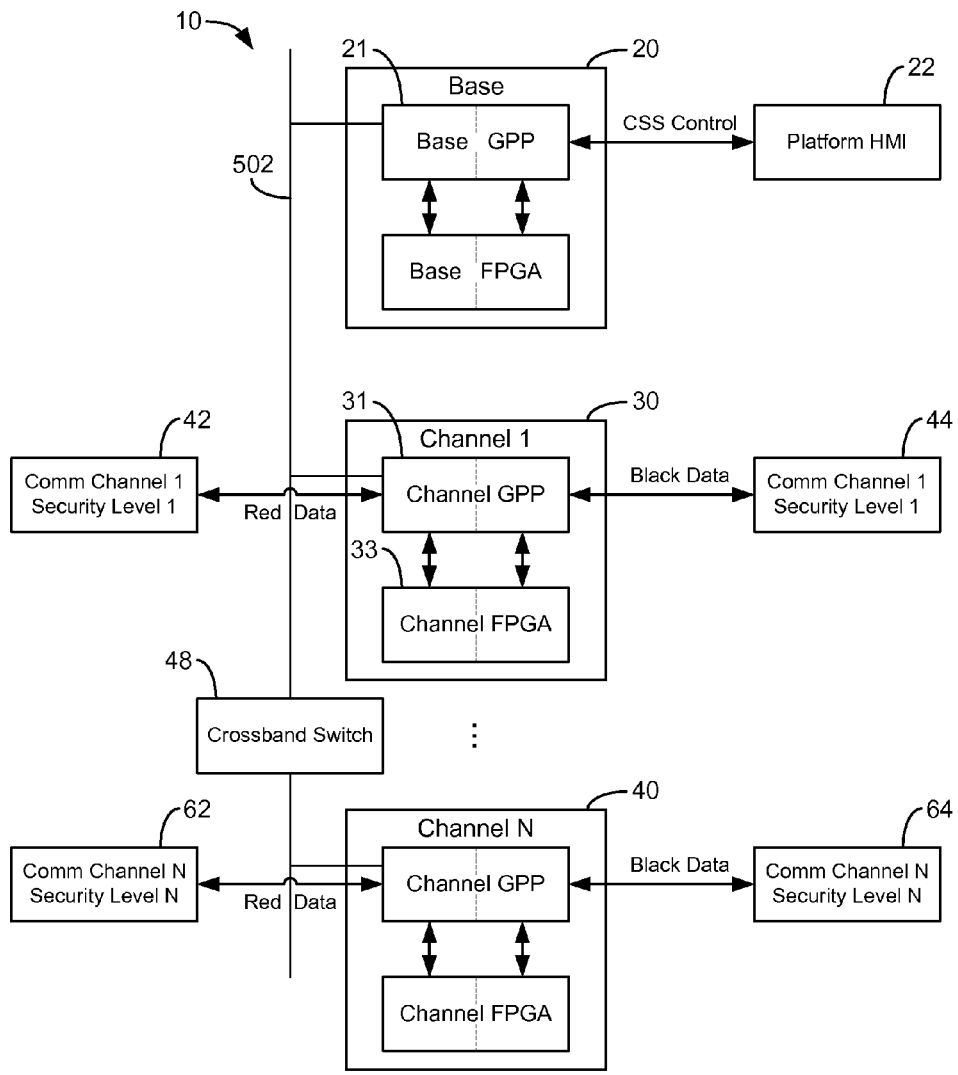
FIG. 5 is a general block diagram of the cryptographic system illustrated in FIG. 1 showing a separation scheme, according to another exemplary embodiment.

With reference to FIG. 5, cryptographic subsystem 11 has an architecture which provides separation in different forms, both logical and physical. Separation is provided for red and black communications using channels 30 and 40, for control and data, and for security levels.

Channels 30 and 40 provide red and black boundary separation for user traffic data that passes through each of channels 30 and 40. Data traffic passes through a bidirectional plug-in (e.g., a plug-in 96 or 98 (FIG. 3)) operating on channel general purpose processor 31 and optionally on channel field programmable gate array 33. The plug-in is implemented as a separate process isolated from other processes running on general purpose processor 31 or channel field programmable gate array 33. Processes running on the same physical processor such as general purpose processor 31 are separated by the operating systems virtual address space (VAS) model and supported by the hardware's memory management unit (MMU).

Cryptographic system 10 includes a control bus or interface 502 which connects base 20 and channels 30 and 40. According to some embodiments, the platform human machine interface 22 may be a red or black interface depending on platform requirements. Interface 502 is physically separate from the red and black interfaces 442, 444, 462, or 464 associated with channel 30 and channel 40. According to further embodiments, the interface 502 is physically separate from Platform HMI 22 associated with base 20. The platform associated with the interface 55 cannot control or interact with any channel 30 or 40 directly. Interaction is only possible through base general purpose processor 21 of base 20 in some embodiments. In some embodiments, a waveform application running in any radio communication channel (e.g., channel 30 or 40) cannot directly interface with base general purpose processor 21 and has only limited control over its channel 30 or 40. This is because the red and black data interfaces are used mainly for user traffic and control/status (out-of-band) bypass within the waveform or between the waveform and the platform human machine interface in some embodiments. Control bus interface 502 is not accessible from outside cryptographic subsystem 11.

Each channel 30 and 40 is a multi-service cryptographic device operating in a single security level in some embodiments. Each channel 30 or 40 can operate at a level caveat, level/compartment, or any other security level sub-division required by the host system. In some embodiments, each of channels 30 and 40 is multi-servicing and multiple plug-ins 96 and 98 (FIG. 3) can be running simultaneously in channels 30 and 40. Plug-ins 96 and 98 can be of arbitrary complexity and may be divided between general purpose processor 31 and field programmable gate array 33 in some embodiments. The number of cryptographic services 446 and 448 (FIG. 4) provided by channels 30 and 40 is limited only by the available general purpose processor and field programmable gate array resources.

Cryptographic services (e.g., services 404, 406, 408, 410, 412, 414, 416, 418 and 420 (FIG. 4)) can be provided using cryptographic subsystem 11 utilizing two different approaches. The cryptographic services are provided with the host platform in some embodiments. The cryptographic services can be provided by a separate process based plug-in 86, 88, 96, and 98 (FIGS. 2-3) which can be used for cryptographic equipment applications 444, 446, and 448 (FIG. 4) where data is transformed from red-to-black or vice versa or may be used for single-sided transmission security cryptographic equipment applications 444, 446, and 448 in one more embodiments. Services 402, 404, 406, 408, 410, 412, 414, 416, 418 and 420 (FIG. 4) can also be provided by at least one dynamically loaded library plug-in which is used for non-transforming cryptographic services or other general purpose security functions in some embodiments. Separate process based plug-ins 86, 88, 96, and 98 (FIGS. 2-3) or dynamically loaded library plug-ins 86, 88, 96, and 98 (FIGS. 2-3) can have an actual hardware acceleration component in some embodiment.

Figure 6:
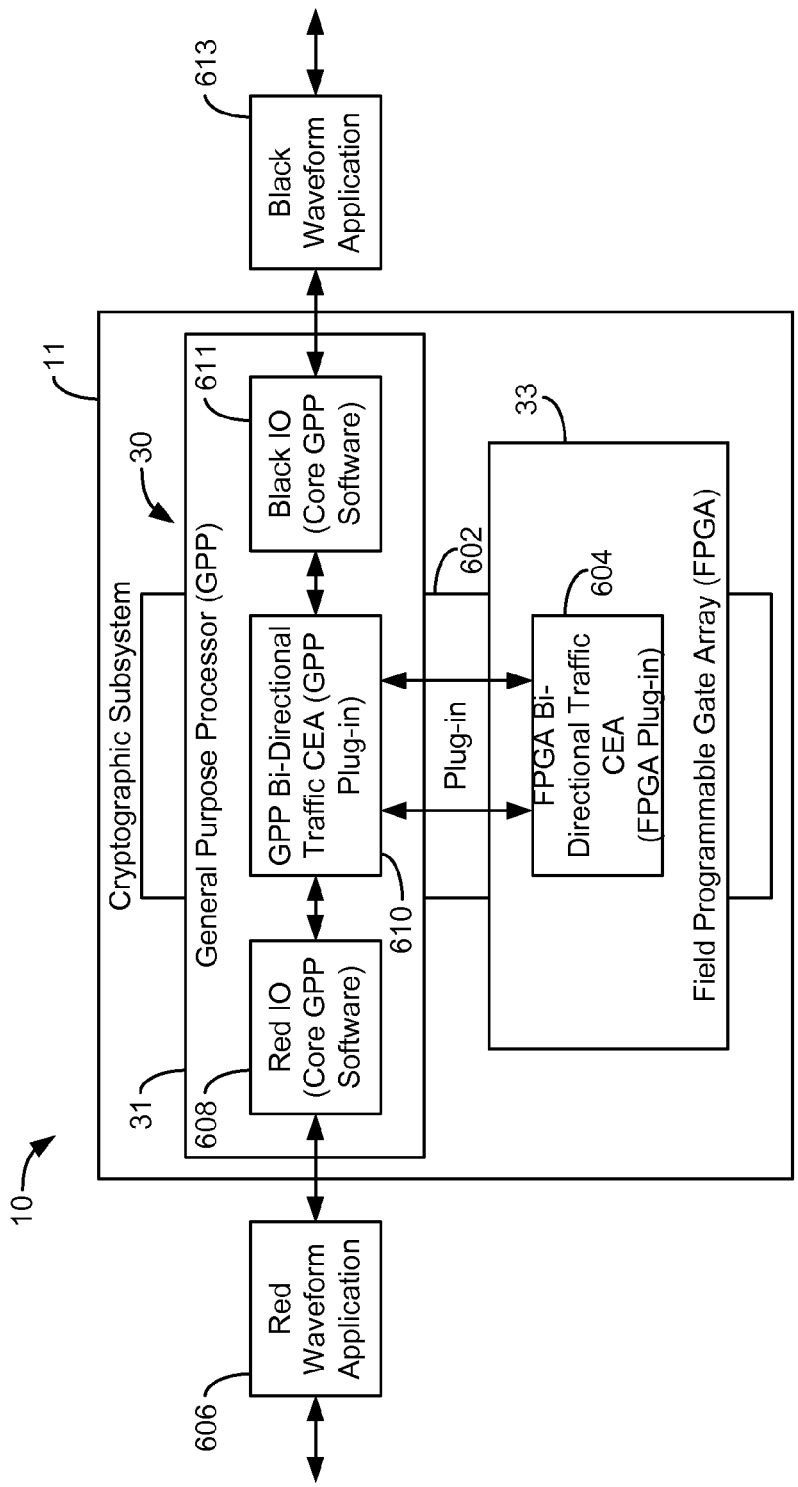
FIG. 6 is general block diagram of the cryptographic system illustrated in FIG. 1 executing a bi-directional communication security plug-in, according to another exemplary embodiment.

With reference to FIG. 6, channel 30 of cryptographic subsystem 11 includes a plug-in 602. As shown in FIG. 6, the plug-in 602 may be implemented as a separate process plug-in. The plug-in 602 provides a GPP bi-directional communication security cryptographic equipment application 610. In some embodiments, plug-in 602 provides both communication to security data transportation services (e.g., services 406, 408, 410, and 412 (FIG. 4)) plus any required in-band bypass checking functions. User data flows into cryptographic subsystem 11 from a red (e.g., host) waveform application 606 where it is received by red interface 608. Software (e.g., common channel layer 94 (FIG. 3)) executed on channel general purpose processor 31 receives the data at interface 608.

The software at interface 608 determines the manner in which to handle the data. In one example, the data is user traffic and the in-band bypass portion of the traffic is verified against the bypass policy and the data is passed to plug-in 602 (GPP bi-directional communication security cryptographic equipment application 610) for transformation. Plug-in 602 is a separate process running on the same general progress processor 31 and performs the transformation in some embodiments. The data is passed using inter process communication in some embodiments.

Once the transformation is complete, the transformed data is passed back to the software (e.g., common channel layer 94 (FIG. 3)) executed on channel general purpose processor 31 at an interface 611 for black waveform application 613. The data is passed using inter process communication in some embodiments. The software at interface 611 re-checks the in-band bypass against the bypass policy and forwards the data to black waveform application 613 in some embodiments.

There is a clear red-black boundary that runs right down the middle of plug-in 602 in some embodiments. A separate process space plug-in is used in this situation to limit the co-existence of both red and black data to the smallest region possible in some embodiments. Separate red/black interfaces are used between general purpose processor plug-ins and field programmable gate array plug-ins in some embodiments. Separate red/black components (processes) are used between plug-in 602 and the host waveform in some embodiments.

Plug-in 602 transforms the data in manner that is specific to the waveform that it is supporting. Depending on the performance requirements of that waveform, plug-in 602 operating on the general purpose processor 31 can perform the entire data transformation on its own or it may leverage field programmable gate array 33 and use FPGA bi-directional traffic cryptographic equipment application 604 (e.g., a plug-in for field programmable gate array 33) for hardware acceleration purposes in some embodiments. FPGA bi-directional traffic cryptographic equipment application 604 can be loaded using a partial reconfiguration in some embodiments. When hardware acceleration (e.g., FPGA bi-directional cryptographic equipment application 604) is used, GPP bi-directional cryptographic equipment application 610 and FPGA bi-directional cryptographic equipment application 604 together form a single plug-in (e.g., 602) and are developed and instantiated together (for example, as a unit) in some embodiments.

FPGA bi-directional cryptographic equipment application 604 can be usable by multiple plug-ins used on general purpose processor 31. In some embodiments, the plug-in architecture and the plug-in development kit allow the level of acceleration needed for each plug-in 602 to be tailored based on program needs. Plug-ins 602 can be implemented completely in general purpose processor 31 which provides quicker and cheaper development but can provide slower performance in some embodiments. Alternatively, plug-in 602 can be implemented completely in field programmable gate array 33 which provides for more expensive development but higher performance. Alternatively, plug-in 602 can operate on both general purpose processor 31 and field programmable gate array 33.

Figure 7:
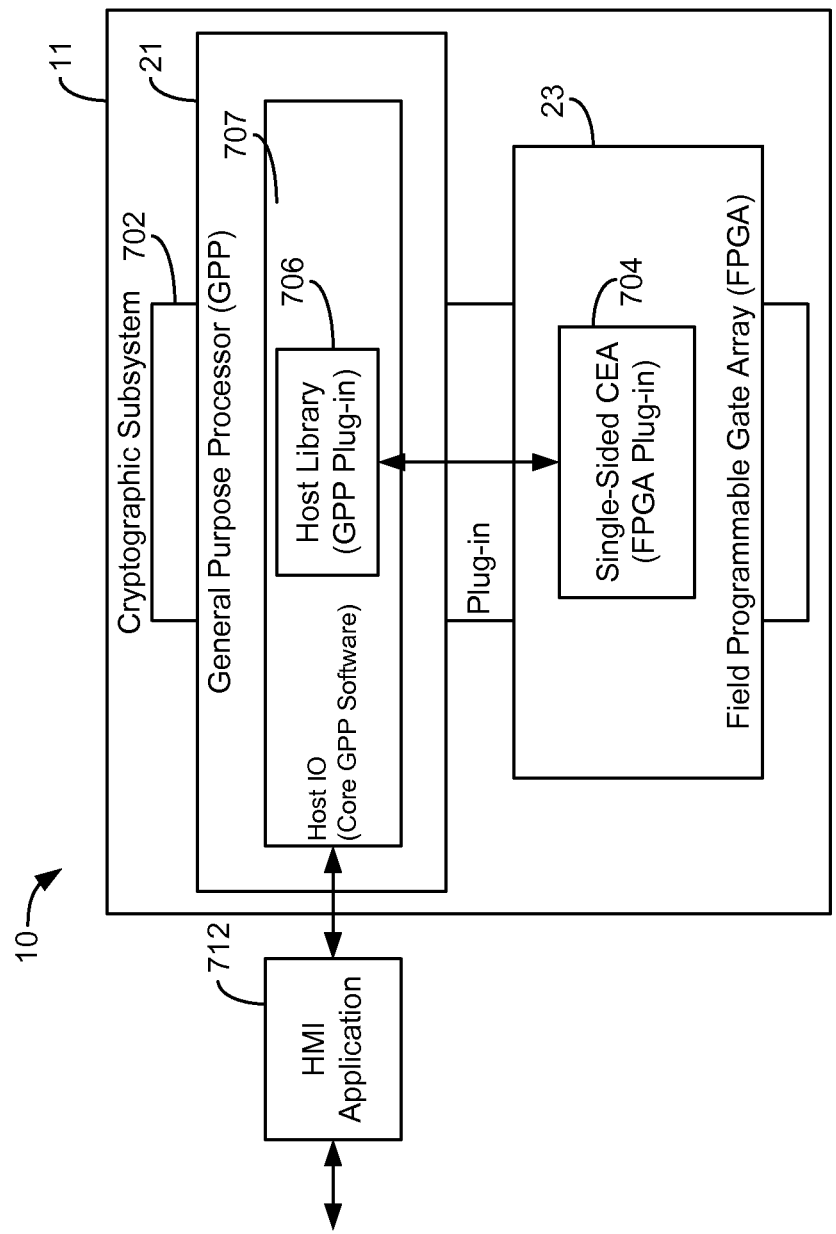
FIG. 7 is a general block diagram of the cryptographic system illustrated in FIG. 1 executing a dynamically loaded library plug-in, according to another exemplary embodiment.

With reference to FIG. 7, processor 21 and field programmable gate array 23 host a plug-in 702 which is dynamically loaded into the address space of the calling component in base 20. The calling component (e.g., Host IO 707) in base 20 can be executed on general purpose processor 21 or field programmable gate array 23. In one embodiment implementing the use of dynamically loaded plugin-ins, the calling component is a general purpose processor and does not include a field programmable gate array component. Plug-in 702 can implement a single sided cryptographic equipment application 706 and a single sided cryptographic equipment application 704 in some embodiments. Plug-in 702 can provide host services at human machine interface application 712. Software (e.g., common core layer 84 (FIG. 2)) executed on core general purpose processor 21 can receive the data at Host IO 707 associated with at human machine interface application 712.

Plug-in 702 may utilize a plug-in (e.g., FPGA single sided cryptographic equipment application 704) for hardware acceleration purposes in some embodiments. Single sided cryptographic equipment applications 704 and 706 can operate together and can form a single plug-in in some embodiments. Unlike the process space plug-ins, dynamically loaded single sided cryptographic equipment application 706 runs in the address space of the current component. Thus, single sided cryptographic equipment applications 704 and 706 are useful for certain small, usually non-transforming, general purpose security functions in some embodiments. Dynamically loaded plug-ins have more a more flexible interface and are a called using simple (polymorphic) subroutine calls in some embodiments. Single sided cryptographic equipment application 706 conforms to its specific base class interface definitions so that it is callable from Host IO 707 according to some embodiments. Different categories of plug-ins can have different interfaces in some embodiments.

Figure 8:
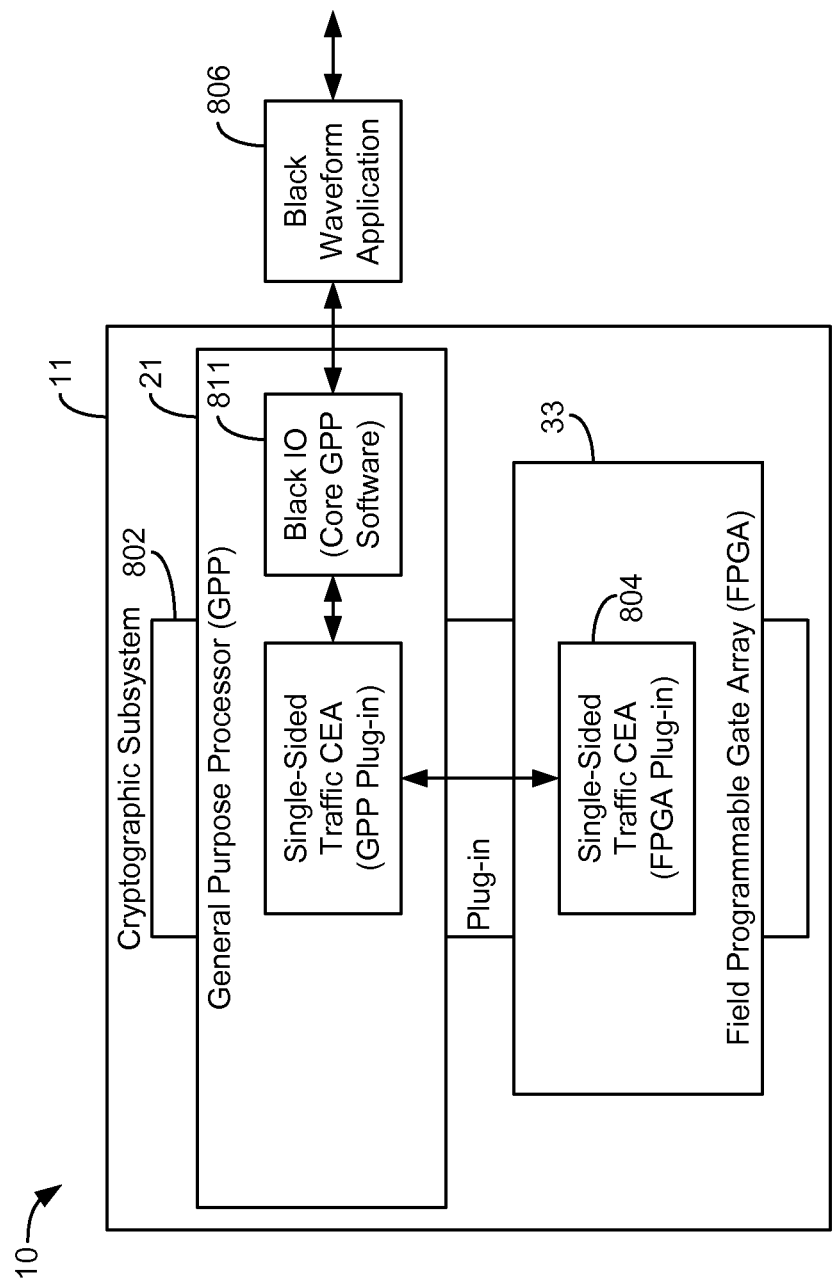
FIG. 8 is a general block diagram of the cryptographic system illustrated in FIG. 1, executing a single sided transmission security plug-in, according to another exemplary embodiment.

With reference to FIG. 8, CSS 11 includes a plug-in 802 configured as a separate process space plug-in in some embodiments. Plug-in 802 implements a single-sided transmission security cryptographic equipment application 803 in some embodiments. User data flows in and out of CSS 11 from a same side via black waveform application 806 using the software (e.g., common channel layer 94 (FIG. 3)) executed on channel general purpose processor 31 at interface 811 for black waveform application 806. In band bypass tracking and inter process communication infrastructure can be used to effect boundary controls in some embodiments. A plug-in 804 on field programmable gate array 33 can be used with plug-in 803 in some embodiments.

Figure 9:
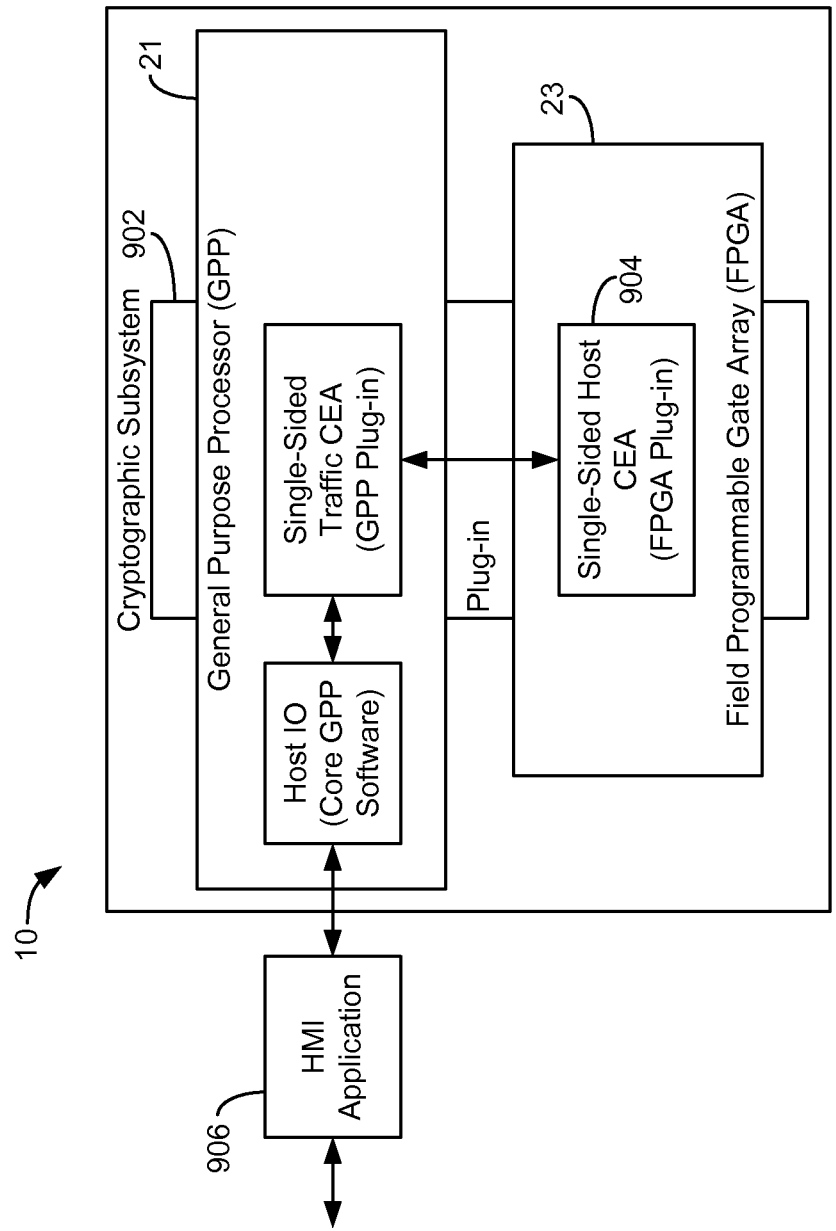
FIG. 9 is a general block diagram of a the cryptographic system illustrated in FIG. 1, executing a single sided host plug-in, according to yet another exemplary embodiment.

With reference to FIG. 9, a plug-in 902 is a single sided plug-in model. Plug-in 902 can be used on general purpose processor 21 and single sided host plug-in 904 can be utilized on field programmable gate array 23. Plug-ins 902 and 904 can be used to provide cryptographic processes through a platform human machine interface application 906 in some embodiments. A single-sided process space separated plug-in such as plug-in 902 could be used for host services include integrity, authentication, and key management (e.g., update, unwrap, wrap) in some embodiments.

Figure 10:
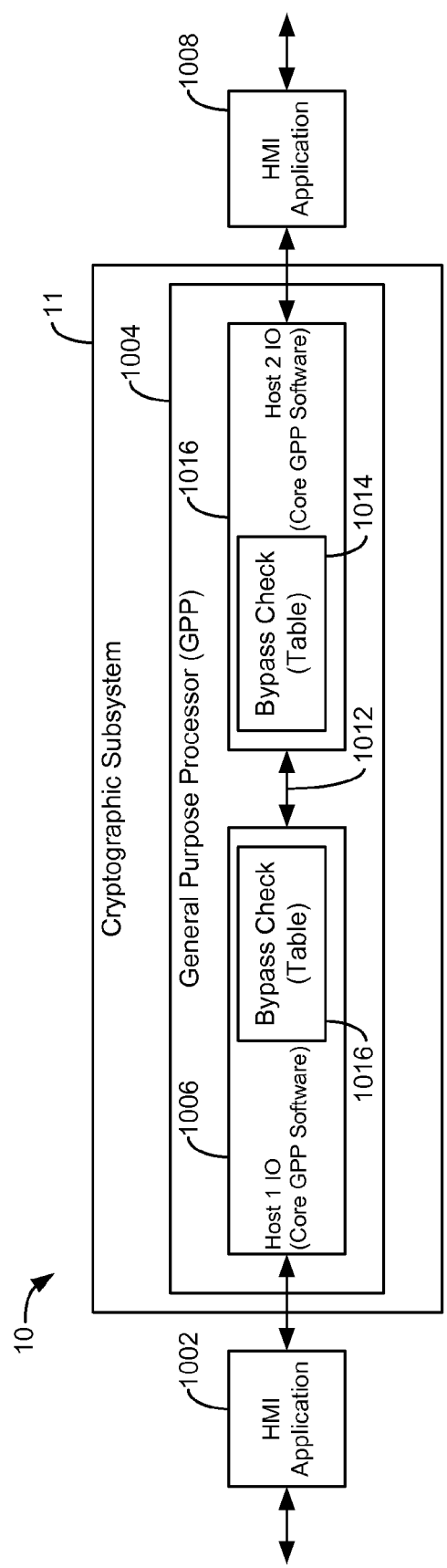
FIG. 10 is a general block diagram of dynamically loaded bypass tables for the cryptographic system illustrate in FIG. 1, according to an exemplary embodiment.

With reference to FIG. 10, CSS 11 can perform control and status bypass checking on any message passing between two processors. In some embodiments, CSS 11 can perform out-of-band bypass checking on any message passing between two processors. A host application 1002 and a host application 1008 represent any two operating environment or waveform components running on different host processes. Each bypass message passes through at least one general purpose processor 1004 which may be general purpose processor 21, 31, and/or 41 (FIG. 1) discussed herein. Cryptographic system 10 checks the bypass message twice even if it is checked twice by the same general purpose processor. For each bypass message, the component determines which of its available bypass tables 1014 and 1016 contains the policy for verifying the message. If a bypass policy cannot be found, message is rejected outright in some embodiments. If a suitable bypass policy is found, the message is verified. If the message is valid, the message is forwarded via inter processor communication to the egressing core component.

While the description herein has referred to secure communications, the systems, methods, and apparatuses described herein may be used for other purposes. The systems, methods, and apparatuses may also be used for data-at-rest or storage applications.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, etc.). For example, the position of elements may be reversed or otherwise varied, and the nature or number of discrete elements or positions may be altered or varied. In another example, any number of plugins and/or customers as described throughout the disclosure can be implemented. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising tangible machine-readable storage media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, a special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A cryptographic product, comprising:
   a base comprising a base general purpose hardware processor configured to execute base software; and
   at least one channel comprising a channel general purpose hardware processor configured to execute channel software, wherein the base software and the channel software each comprise an abstract layer providing a common interface for operating system functions, a common layer operating above the abstract layer, and one of a first software plug-in for a first customer or a second software plug-in for a second customer, wherein the common layer provides code necessary to execute the first software plug-in or the second software plug-in, wherein the base provides communication management between a host and the cryptographic product and the channel provides encryption/decryption of data between a red side of the channel and a block black side of the channel, the channel including a first interface in communication with red data on the red side of the channel and a second interface in communication with black data on the black side of the channel;
   a third interface configured to connect the base to the at least one channel, wherein the third interface is physically separated from the host;
   a core field programmable array; and a channel field programmable array, wherein the common layer includes elements executed on the core field programmable array, wherein the core field programmable array provides accelerator functions for the channel.

2. The cryptographic product of claim 1, wherein the first customer is a domestic, United States customer and the second customer is an international customer.

3. The cryptographic product of the claim 1, further comprising a software defined radio elements coupled to channels associated with the channel general purpose processor.

4. The cryptographic product of claim 1, wherein common layer is agnostic with respect to requirements of the first customer and the second customer.

5. The cryptographic product method of claim 1, further comprising:
   a cross switch between the channel general purpose processor and the core general purpose processor.

6. The cryptographic product of claim 1, wherein the common layer comprises a set of processes in independent memory address spaces, wherein the processes are logically separated.

7. The cryptographic product of claim 1, wherein the first plug-ins and the second plug-ins are separate space plug-ins or dynamically loaded library plug-ins.

8. A method of communicating cryptographic data, the method comprising:
   executing an abstract layer on a base general purpose hardware processor and a channel general purpose hardware processor to provide a common interface for operating system functions;
   executing a common layer above the abstract layer to translate between the operating system functions and plug-in level functions; providing, by the common layer, code necessary to execute a first software plug-in configured for a first customer or a second software plug-in configured for a second customer;
   providing, by the base general purpose hardware processor, communication management between a host and a cryptographic product;
   providing, by the channel general purpose hardware processor, encryption/decryption of data between a red side of a channel and a black side of a channel, the channel including a first interface in communication with red data on the red side of the channel and a second interface in communication with black data on the black side of the channel; and executing at least one plug-in configured for a first customer or a second customer, the plug-in separated from the abstract layer and the common layer by a virtual address space model, wherein the plug-ins are executed using field programmable gate arrays as accelerators.

9. The method of the claim 8, wherein the plug-ins are cryptographic functions.

10. The method of claim 8, wherein the plug-ins are field programmable gate array bit streams.

11. The method of claim 8, further comprising:
encrypting and decrypting data using the channel processor and a channel field programmable gate array.

12. The method of claim 8, further comprising:
providing red/black communication separation.

13. The method of claim 12, further comprising:
providing control data separation.

14. The method of claim 8, wherein the plug-ins are separate process space plug-ins or dynamically loadable library plug-ins.

15. A communication system, comprising:
a base interface configured to execute an operating system, the base interface configured to provide communication management between a host and a cryptographic product; and
a channel interface configured to encrypt and decrypt data in response to plug-in execution, the base interface connected to the channel interface by a third interface physically separated from the host, the base interface and channel interface each comprising an abstract layer providing a common interface for operating system functions and a common layer operating above the abstract layer, the channel interface comprising a field programmable gate array including an accelerator loaded using a partial reconfiguration mechanism, the field programmable gate array configured to provide accelerator functions for the channel interface, the plug-in configured to execute a bi-direction traffic cryptographic equipment application to logically separate a red side of the channel interface and a black side of the channel interface, the plug-in being one of a first software plug-in for a first customer or a second software plug-in for a second customer.

16. The communication system of claim 15, wherein core software operates on a channel general purpose processor of the channel interface.

17. The communication system of claim 16, wherein a bit stream is executed on the field programmable gate array.

* * * * *